(12) United States Patent
Massam et al.

(10) Patent No.: US 8,443,064 B2
(45) Date of Patent: May 14, 2013

(54) METHOD FOR NETWORK DEVICE CONFIGURATION

(75) Inventors: Christopher James Massam, Auckland (NZ); Dennis Warren Monks, Auckland (NZ)

(73) Assignee: Yellowtuna Holdings Limited, Auckland (NZ)

( * ) Notice: Subject to any disclaimer, the term of this patent is extended or adjusted under 35 U.S.C. 154(b) by 0 days.

(21) Appl. No.: 13/421,435

(22) Filed: Mar. 15, 2012

(65) Prior Publication Data

US 2012/0173683 A1 Jul. 5, 2012

Related U.S. Application Data

(60) Division of application No. 11/866,540, filed on Oct. 3, 2007, now abandoned, which is a continuation of application No. 10/540,328, filed as application No. PCT/NZ03/00265 on Dec. 1, 2003, now Pat. No. 8,171,143.

(30) Foreign Application Priority Data

Dec. 24, 2002 (NZ) .................................... 523378

(51) Int. Cl.
*G06F 15/16* (2006.01)
*G06F 15/177* (2006.01)

(52) U.S. Cl.
USPC ........... 709/221; 709/219; 709/220; 709/222; 709/223; 709/224

(58) Field of Classification Search ........... 709/219–224
See application file for complete search history.

(56) References Cited

U.S. PATENT DOCUMENTS

| | | | |
|---|---|---|---|
| 5,297,192 A | | 3/1994 | Gersberg |
| 5,410,598 A | * | 4/1995 | Shear ............................. 705/53 |
| 5,838,907 A | * | 11/1998 | Hansen ....................... 709/220 |
| 6,012,088 A | | 1/2000 | Li et al. |
| 6,023,464 A | * | 2/2000 | Woundy ....................... 370/352 |
| 6,029,196 A | | 2/2000 | Lenz |
| 6,073,172 A | | 6/2000 | Frailong et al. |
| 6,101,182 A | * | 8/2000 | Sistanizadeh et al. ........ 370/352 |
| 6,170,061 B1 | * | 1/2001 | Beser ................................ 726/3 |

(Continued)

FOREIGN PATENT DOCUMENTS

| | | |
|---|---|---|
| WO | WO 01/86435 | 11/2001 |
| WO | WO 02/15517 | 2/2002 |

(Continued)

OTHER PUBLICATIONS

Internet Telephony over SIP, Dai et al., Microelectronics & Computer, 2000, vol. 17, No. 4, p. 23-27.

*Primary Examiner* — Kevin Bates
*Assistant Examiner* — Robert B McAdams
(74) *Attorney, Agent, or Firm* — Young & Thompson

(57) ABSTRACT

A network device initially has no configuration data and is permitted only to query a known network address. From this address a server verifies the connection and authorizes another server to download to the network device the necessary configuration to carry out its purpose. This configuration may not be amended and is not retained on power loss. Any updates are carried out by a complete reload of configuration data.

7 Claims, 3 Drawing Sheets

U.S. PATENT DOCUMENTS

| | | | |
|---|---|---|---|
| 6,195,689 B1 * | 2/2001 | Bahlmann | 709/217 |
| 6,275,942 B1 | 8/2001 | Bernhard et al. | |
| 6,286,038 B1 * | 9/2001 | Reichmeyer et al. | 709/220 |
| 6,385,648 B1 | 5/2002 | Philippou et al. | |
| 6,496,858 B1 | 12/2002 | Frailong et al. | |
| 6,636,505 B1 | 10/2003 | Wang et al. | |
| 6,697,360 B1 | 2/2004 | Gai et al. | |
| 6,757,723 B1 * | 6/2004 | O'Toole et al. | 709/222 |
| 6,854,009 B1 * | 2/2005 | Hughes | 709/220 |
| 6,873,628 B1 | 3/2005 | Tang | |
| 6,912,567 B1 * | 6/2005 | Allard et al. | 709/223 |
| 7,043,537 B1 | 5/2006 | Pratt | |
| 7,046,675 B2 | 5/2006 | Lund | |
| 7,062,274 B2 | 6/2006 | Shell et al. | |
| 7,085,854 B2 | 8/2006 | Keane et al. | |
| 7,099,338 B1 | 8/2006 | Lee | |
| 7,111,054 B2 | 9/2006 | Lo | |
| 7,127,049 B2 | 10/2006 | Godse et al. | |
| 7,313,384 B1 | 12/2007 | Meenan et al. | |
| 7,313,606 B2 | 12/2007 | Donahue et al. | |
| 7,739,359 B1 * | 6/2010 | Millet et al. | 709/220 |
| 2001/0001866 A1 | 5/2001 | Kikinis | |
| 2001/0052001 A1 * | 12/2001 | Stern | 709/219 |
| 2002/0112053 A1 * | 8/2002 | Christensen et al. | 709/224 |
| 2002/0161868 A1 | 10/2002 | Paul et al. | |
| 2002/0174246 A1 | 11/2002 | Tanay et al. | |
| 2002/0184512 A1 | 12/2002 | Cardoso | |
| 2003/0028625 A1 | 2/2003 | Sanjeev et al. | |
| 2003/0039244 A1 | 2/2003 | Owens et al. | |
| 2003/0039268 A1 | 2/2003 | Chong et al. | |
| 2003/0177385 A1 | 9/2003 | Price et al. | |
| 2004/0105444 A1 | 6/2004 | Korotin et al. | |

FOREIGN PATENT DOCUMENTS

| | | |
|---|---|---|
| WO | WO 02/19135 | 3/2002 |
| WO | WO 02/056621 | 7/2002 |
| WO | WO 02/077808 | 10/2002 |

* cited by examiner

METHOD FOR NETWORK DEVICE CONFIGURATION

CROSS REFERENCE TO RELATED APPLICATIONS

This application is a division of co-pending application Ser. No. 11/866,540 filed on Oct. 3, 2007, which is a continuation of U.S. application Ser. No. 10/540,328, filed on Jun. 21, 2005, which is a National Stage of PCT/NZ2003/000265 filed on Dec. 1, 2003, which claims foreign priority to New Zealand application No. 523378 filed on Dec. 24, 2002. The entire content of each of these applications is hereby incorporated by reference.

BACKGROUND OF THE INVENTION

1. Field of the Invention

Technical Field This invention relates to connecting to the internet via a data connection which connection is remotely configurable as to access permissions. The connection may be via a modem or via a direct network connection.

2. Description of the Related Art

Connection of network devices to a network typically require the attendance of a person on site to carry out the initial configuration of the device. For example, connection of a users business to the internet for access by internal parties may be by ADSL (Asymmetric Digital Subscriber Line) or some other connection protocol.

Such a connection is typically via an ADSL modem and may include a router to route incoming data packets and a firewall to stop attempts to intrude into the users data.

Typically the configuration of the router and firewall is done on site and will need to be changed on site to cater for variations over time in the users business. This involves a smaller user in expense as it requires specialized IT personnel to come on site to carry out the configuration.

Connections for higher volume users also typically include routers and firewalls connected via a plurality of modems for internet access. Currently these are mainly configured on site by the users skilled personnel. It is known, once the initial configuration is carried out, that the device may be remotely connected to via the network and final configuration carried out.

Typically such a network device will include an operating system of some sort which will be accessible by using an external name and password. Once the correct name and password is entered the remote user may modify the device settings, including settings for any router and firewall. This provides security problems, since it is possible for someone with knowledge of the name and password to alter the modem settings without authority.

It is therefore an object of the present invention to provide a network device which does not require any on site attendance for configuration of the network device but which is secure or which will at least provide the public with a useful choice.

It is known to provide remotely configured routers to avoid attendance on site, for instance U.S. Pat. No. 6,012,088 shows one such router, however such routers may provide a security problem in that if access is gained to them from one of the networks the router configuration can be changed, and may be changed in such a manner as to compromise security.

It is therefore an object of the present invention to provide an internet connection which does not require on site attendance for configuration of router or firewall but which does provide complete security of the configuration or which will at least provide the public with a useful choice.

SUMMARY OF THE INVENTION

Accordingly, the invention may broadly be said to consist in a network device having operating software but no configuration data allowing it to carry out its intended purpose which network device is remotely programmable with configuration data as a whole but which network device or operating software has no facility to allow any incremental change of configuration data.

Preferably the device configuration data is held in random access memory (RAM) and is lost when no network device supply voltage is present.

Preferably the device software contains a routine which on initialization attempts to contact a remote verification authority to authorize retrieval of configuration data from a configuration authority.

Preferably the device software contains only the routine for contacting the remote verification authority and receiving data from the remote configuration authority.

Preferably the contact with the remote verification authority is subject to encryption.

Preferably the device initially contains an input filter which will only receive configuration data from a specified remote configuration authority address.

Preferably the device is a router which is integral with a modem.

Preferably the modem is an asymmetric digital subscriber line (ADSL) modem.

Alternatively the invention may be said to lie in the method of configuring a network device which loses its configuration data on power loss comprising providing a network device without user configuration data, providing within the network device a routine which securely contacts a remote verification authority, and downloading from a remote configuration authority authorized by the remote verification authority the entire configuration data.

Preferably the network device is a router.

Preferably the router is part of an ADSL modem.

Preferably the network device is capable of being configured only by remote download of the complete configuration data.

Preferably the network device routine which contacts the remote verification authority carries out any information transfer using secure encryption.

Preferably the secure encryption uses a public key encryption method.

Preferably the private key for the network device is provided by a device temporarily connected to the network device.

Preferably the temporarily connected device is a USB memory device.

Preferably the configuration data is also lost from the network device on any intrusion attempt.

Alternatively the invention may be said to consist in a method of providing communication between two network devices of unknown network address wherein each device is required to download its configuration parameters from a server at a known network address each time the device is initialized, the devices allocated network addresses are stored at server, the server may be queried for the allocated network addresses of the two network devices, and wherein communications can be initiated between the two network addresses from this data.

Preferably the two network devices are routers.

Preferably the routers form part of ADSL modems.

The invention may also broadly be said to consist in the parts, elements and features referred to or indicated in the specification of the application, individually or collectively, and any or all combinations of any two or more of the parts, elements or features, and where specific integers are mentioned herein which have known equivalents, such equivalents are incorporated herein as if they were individually set forth.

BRIEF DESCRIPTION OF DRAWINGS

One preferred form of the invention will now be described with reference to the accompanying drawings in which.

DETAILED DESCRIPTION OF THE PREFERRED EMBODIMENTS

Figure 1:
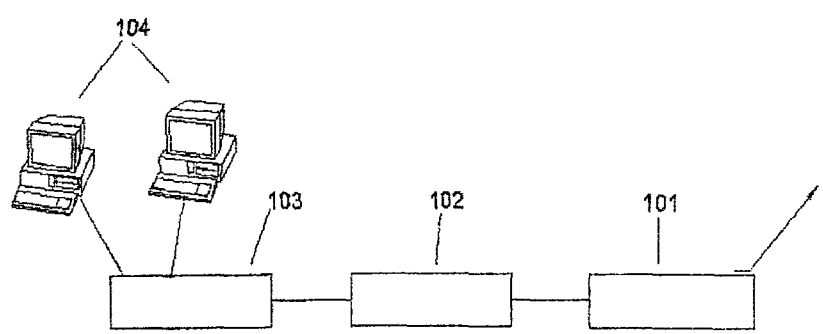
FIG. 1 shows a block diagram of one form of network device.

With reference to FIG. 1, the diagram shows a network device consisting of an ADSL connection via a modem 101 to a firewall 102 and router 103 which distributes the data to devices such as PC's 104. The modem acts to convert packets from the firewall router into a form suitable for carrying information over the internet. The firewall 102 acts to restrict what information packets may be transferred into the users system and the router 103 acts to distribute packets to an internal user in accordance with the packet address.

In practice the modem, firewall and router may be combined into a single item of equipment with the configuration data held in a common internal location.

According to the current invention the modem, or firewall or router, has configuration information, which is internally held, but this information is not capable of being changed by any routine or subroutine held in the modem. The only way in which this information can be altered is to download an updated configuration from a remote authority. The only remote authority which the modem recognizes are ones which are hard coded into the internal software, and the only action the modem can take as regards configuration is to contact the remote authority in a secure manner. This action can occur either at power on or if an intrusion is detected, or it can be triggered by a specific remote query.

Figure 3:
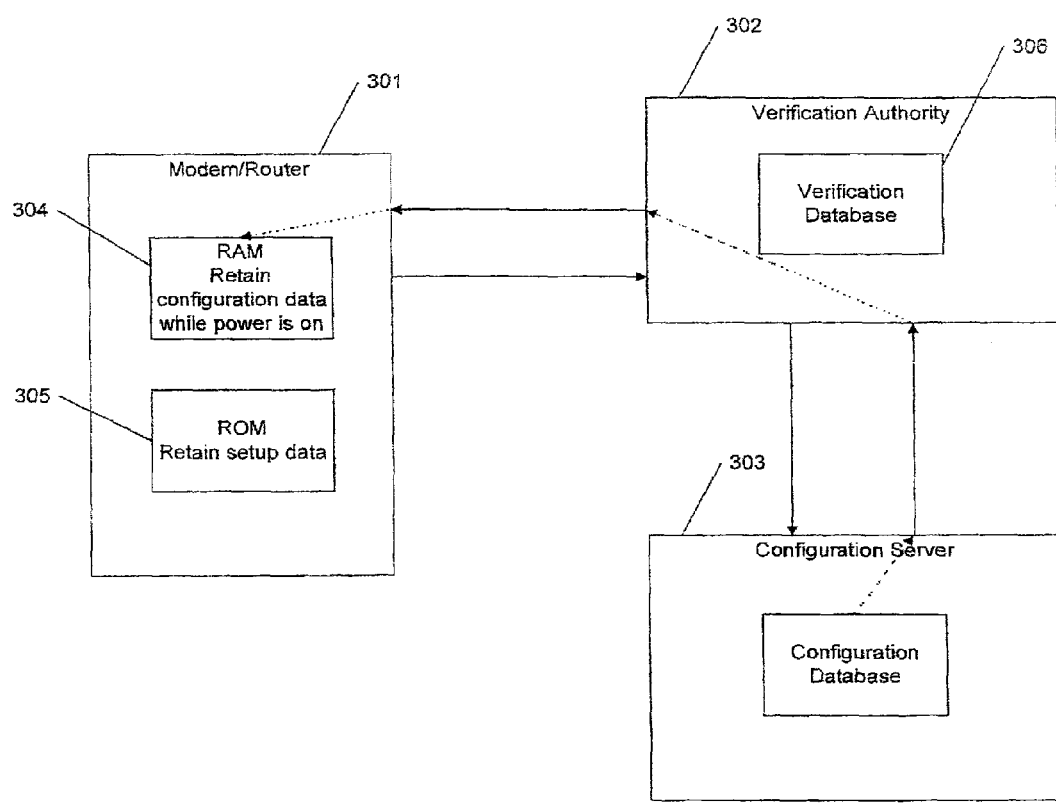
FIG. 3 shows an overview of the components for verification.

Thus the modem may have instructions in read only memory (ROM) 305 in FIG. 3, which instruct it to call an address such as 203.17. 209.32 upon initial power on, but to otherwise provide no routing of incoming or outgoing data packets. Once the designated address is called and a verification established for the network device from a verification service a secure connection between the modem and the address is set up, preferably by the exchange of encrypted passwords through a secure sockets layer (SSL), and the modems' required configuration is downloaded from a configuration server. This provides the routing configuration required and leaves the modem in a secure state.

The configuration may include any connection data and passwords for connecting the modem to an internet service provider (ISP), and the modem may automatically carry out the connection once configured.

Where the connection between the modem and the server is such that it does not support full public key encryption the authentication for the modem may be provided by a removable key, for instance a USB key.

Should an attempt be made to configure or reconfigure the modem without using the correct encryption from the correct address the modem initialization software is intended to be re-triggered, resulting in a complete download of the required configuration.

Figure 2:
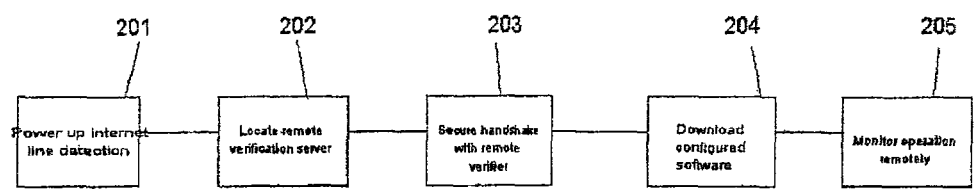
FIG. 2 shows a flow diagram of the initial mediation procedure which downloads to the network device.
Figure 4:
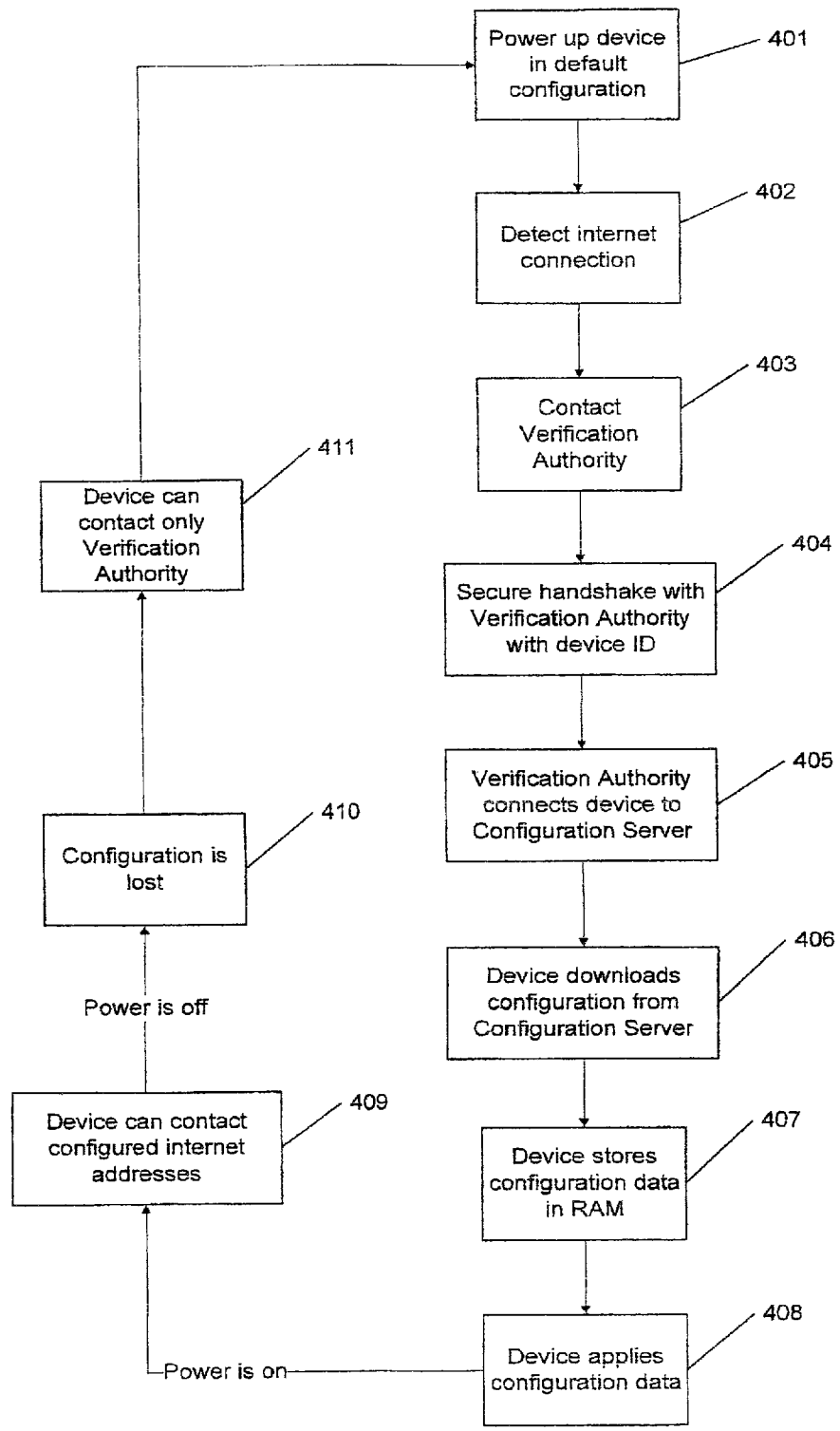
FIG. 4 shows a method of verifying the device.

FIGS. 2, 3 and 4 shows how the equipment 301 on powering on at 201, 401 searches for an internet connection at, and on detecting one 402 sends a particular data stream to the remote verification authority 302 at 202, 403, secure handshake 203, 404 which detects the identity of the calling equipment, and from this can look up the customers identity, the equipments current state, and its desired state as required by the customer. The remote authority then connects 405 a configuration server 303 and initiates the procedure to securely update the equipment at 204, 406 with the desired configuration changes by downloading device configuration data to be held in random access memory 304 (RAM) 407 and is lost 410 when no network device supply voltage is present and with the software required to carry out the desired functions 408. The remote configuration authority can then continue to receive operation reports from the equipment at scheduled intervals.

In accordance with the present invention the modem, firewall and router are normally provided as a single equipment item which may also include a hub or switch. This item is installed on the users premises, provided with a connection to the internet and powered up 401. On detecting the internet connection 402 the equipment identifies itself to the remote verification authority 403, the only action it is capable of taking 411.

The remote authority will detect the identification of the calling equipment and validate this against a database 306 of equipment whose setups are stored 404. If the equipment ID is found the remote authority may then, in secure mode, connect the calling equipment to a configuration service and download to the equipment 406 such configuration details and software as will allow it to perform the desired router/ firewall functions 409.

Preferably the equipment configuration template is held by the remote authority, who may either make changes in it or allow the user to make changes in it via secure internet access. Such changes may be downloaded to the equipment in the same manner as the initial configuration data, though in most instances the remote authority will send a code to the equipment which forces it to reload the configuration.

The firewall and router may maintain the normal statistics of packets passed, addresses sent to or received from, intrusion attempts etc. and may, either on prompting or on schedule, send these details to the configuration authority for storage and possible analysis.

The firewall or router may be set up to pass information through desired ports and may be set to configure these ports on call. Thus if a client requires a VPN connection between two locations which do not have a specific allocated IP address (as for instance a small office served by an ADSL without a fixed address) the client requests the VPN connection from the remote authority, which will have stored the network address of any modem of the inventive type. The remote authority then notifies the network devices of the required connection and the devices then create the VPN connection. Thus a VPN connection can be established between two modems which did not initially know each others addresses.

While the invention is described in relation to an ADSL modem the invention is equally as applicable to the configuration of a PC, a router of any type, a mobile phone or PDA or other similar equipment.

INDUSTRIAL APPLICABILITY

The invention is applicable to the guaranteeing of the configuration of a network device, to prevent the compromising of data passing through that device, or the extraction of data in an unintended manner by that device.

Thus it can be seen that at least the preferred form of the invention provides an item of equipment which can be remotely configured for network device set up purposes.

The invention claimed is:

1. A method of configuring and storing traffic information from a customer internet connection modem, the method comprising:

providing a remote authority, contactable through the internet by a customer internet connection modem, providing a configuration service, contactable through the internet by the customer internet connection modem, the configuration service maintaining customer configuration information for the customer internet connection modem and the remote authority storing traffic information on operation of the customer internet connection modem, the customer configuration information for the customer internet connection modem including a scheduler and instructions to store the traffic information within the customer internet connection modem, providing the customer internet connection modem within a customer's premises, the customer internet connection modem containing instructions in read only memory (ROM), which on turning power ON directs the customer internet connection modem to contact only the remote authority via an internet connection with an identifier of the customer internet connection modem, detecting at the remote authority a data stream from the customer internet connection modem and looking up the identity of the customer internet connection modem from this data stream;

downloading the customer configuration information for the customer internet connection modem and storing the downloaded customer configuration information in random access memory (RAM) in the customer internet connection modem, connecting the customer internet connection modem to the internet using the downloaded customer configuration information, allowing alteration of the customer configuration information only by downloading updated customer configuration information from the remote authority, providing from the customer internet connection modem to the remote authority the traffic information at the customer internet connection modem, the traffic information being transferred from the customer internet connection modem in accordance with the scheduler stored in the RAM of the customer internet connection modem, wherein the customer internet connection modem loses all of the customer configuration information stored in the RAM on loss of power, wherein the traffic information is available to the customer internet connection modem from the remote authority, and wherein changes in the customer configuration information at the configuration service may be downloaded by the customer internet connection modem.

2. A method of managing a plurality of customer internet connection modems, the method comprising:

providing a remote authority, contactable through the internet by plural customer internet connection modems, providing a configuration service, contactable through the internet by each of the customer internet connection modems, the configuration service maintaining customer configuration information for each of the customer internet connection modems and the remote authority storing traffic information on operation of each of the customer internet connection modems, allowing each of the customer internet connection modems to connect to a respective customer internet connection, each of the customer internet connection modems having stored in read only memory (ROM) a routine that is adapted to only contact the remote authority via a first internet connection path with an identifier of the respective customer internet connection modem, detecting at the remote authority from a data stream from the respective customer internet connection modem an identity of the respective customer internet connection modem;

the identified customer internet connection modem downloading the customer configuration information for the respective customer internet connection modem, providing the respective customer internet connection modem with the downloaded configuration information and connecting the respective customer internet connection modem to the internet using the downloaded customer configuration information, and allowing alteration of the customer configuration information only by downloading updated customer configuration information from the remote authority, storing the traffic information in the customer internet connection modems and sending from each of the customer internet connection modems to the remote authority the traffic information stored in the respective customer internet connection modem, wherein each of the customer internet connection modems loses all the customer configuration information on loss of power, wherein customer internet connection modem traffic information is available to each customer from the configuration service, and wherein changes in the configuration information at the configuration service may be downloaded by each of the customer internet connection modems.

3. The method as claimed in claim 1, wherein the customer configuration information is deleted from the customer internet connection modem on any intrusion attempt.

4. The method as claimed in claim 2, wherein the customer configuration information is deleted from the customer internet connection modems on any intrusion attempt.

5. The method as claimed in claim 1, wherein the customer configuration information includes a routine for sending the traffic information to the remote authority on receipt of a prompt from the remote authority.

6. A method of configuring and storing traffic information from a customer internet connection modem, the method comprising:

providing a remote authority, contactable through the internet by a customer internet connection modem, providing a configuration service, contactable through the internet by the customer internet connection modem, the configuration service maintaining customer configuration information for the customer internet connection modem and the remote authority storing traffic information on operation of the customer internet connection modem, the customer configuration information for the customer internet connection modem including a routine for storing the traffic information and sending the traffic information to the remote authority when required, providing the customer internet connection modem within a customer's premises, the customer internet connection modem containing instructions in read only memory (ROM), which on turning power ON directs the customer internet connection modem to contact only the remote authority via an internet connection with an identifier of the customer internet connection modem, detecting at the remote authority a data stream from the customer internet connection modem and looking up the identity of the customer internet connection modem from this data stream, downloading the customer configuration information for the customer internet connection modem and storing the downloaded customer configuration information in random access memory (RAM) in the customer internet connection modem, connecting the customer internet connection modem to the internet using the downloaded customer configuration information, allowing alteration of the customer configuration information only by downloading updated customer configuration information from the remote authority, providing from the customer internet connection modem to the remote authority the traffic information at the customer internet connection modem when required, wherein the customer internet connection modem loses all of the customer configuration information stored in the RAM on loss of power, wherein the traffic information is available to the customer internet connection modem from the remote authority, and wherein changes in the customer configuration information at the configuration service may be downloaded by the customer internet connection modem.

7. The method as claimed in claim 6, wherein the customer configuration information is deleted from the customer internet connection modem on any intrusion attempt.

* * * * *